FIG. 1

INVENTOR
WILLIAM H. GERSTENSLAGER
BY
ATTORNEY

INVENTOR.
WILLIAM H. GERSTENSLAGER
BY
ATTORNEY

May 16, 1950     W. H. GERSTENSLAGER     2,508,246
TUBE-TESTING APPARATUS Filed Sept. 25, 1947     5 Sheets-Sheet 4

INVENTOR
WILLIAM H. GERSTENSLAGER

BY

ATTORNEY

Patented May 16, 1950

2,508,246

UNITED STATES PATENT OFFICE 2,508,246

TUBE-TESTING APPARATUS

William H. Gerstenslager, Akron, Ohio, assignor to Wingfoot Corporation, Akron, Ohio, a corporation of Delaware Application September 25, 1947, Serial No. 776,085

14 Claims. (Cl. 73—49)

This invention relates to an apparatus for testing inflatable bodies for porosity or defects that may be caused by injury during the process of manufacturing such bodies. More particularly the invention relates to the testing of tubes of the form of an annulus which are composed of a flexible elastic material, such as rubber and the like, used as an inner air-container for pneumatic tires and the like.

Previous apparatus for testing tubes by submerging in a liquid were adequate for tubes having a cross-sectional diameter up to seven inches, or inner tubes used in passenger-car tires, but they do not possess the capacity to test tubes of large cross-sectional diameter such as used in tires for trucks, buses, tractors and earth-moving vehicles, some of which require inner tubes having a cross-sectional diameter of 24 inches when inflated. Tubes of this character are in the form of an annulus, and the term "cross-section" used herein is defined by a section taken on a line which is normal to the generating axis of the annulus.

Prior practice in testing tubes of the larger sizes has been to partially inflate them, then leave them in this inflated condition for a period of time to determine if any of the inflating fluid had escaped. This process did not reveal the location of the leak so defective tubes were again inflated to a higher pressure in order to locate and repair the defect.

An object of the present invention is to provide an apparatus that will submerge and manipulate tubes of the larger sizes, such as are used on trucks, buses, tractors and earth-moving vehicles, or tires generally referred to as off-the-road tires.

Another object of this invention is to provide a device possessing sufficient force to submerge tubes of large cross-sectional diameter, some of which require a thrust of 1400 pounds to be properly submerged, stretched and held while being tested.

Another object of the invention is to provide an apparatus that will automatically submerge, radially stretch and rotate partially inflated tubes efficiently with a minimum of time and labor without injury to the tubes, one which is easy to operate, simple in construction and capable of handling a wide range of sizes.

The aforesaid objects of the invention, and other objects will become apparent as the description proceeds. For a better understanding of the invention reference should be had to the accompanying drawings wherein:

Although the principles of the invention are broadly applicable to testing tubes of large cross-sectional diameter, the invention is also applicable to the testing of the smaller and all intermediate sizes.

With specific reference to the form of the invention illustrated in the drawings, the numeral 1 indicates an open-topped liquid-containing vessel or tank cylindrical in form. Liquid is supplied to the tank through a supply line 2, a drain line 3 is provided to drain the liquid from the tank when not in use.

A structural-steel frame-work 4 comprising a pair of vertical members 5 positioned diametrically opposite one another with respect to said tank are tied together at their upper ends by a pair of cross-members 6. Centrally mounted on top of the cross-members and attached thereto by the bolts 7 a rectangular plate 8 has suspended from each corner thereof fluid-pressure cylinders 9.

The cylinders 9, identical in construction, have their lower flanged ends extending through openings in a plate or platform 10.

Disposed within the cylinders 9 are double-acting pistons 11 attached to piston rods 12 which extend downwardly to a spider plate 13 to which they are securely attached.

The spider plate 13 forms the body member of a carriage indicated generally by the numeral 14 which is raised and lowered by the action of the pistons 11 within the cylinders 9.

Aiding the piston rods 12 in keeping the carriage in alinement on its vertical up-and-down movement are a pair of guides, which consist of tubular members 15 which are attached to each cross-member 6 and plate 10 of the frame, and a pair of rods 16 attached to the spider plate in sliding relationship in said tubes.

The spider plate 13 is circular in form having a boss 17 formed centrally on its lower side from which ribs 18 extend radially beyond the outer periphery of the plate terminating in the form of bosses 19, to which arms 20 are pivotally mounted by the pins 21. Six arms of identical form are thus connected to the spider plate that serves to submerge and manipulate pneumatic tubes, as will be described later.

Figure 1:
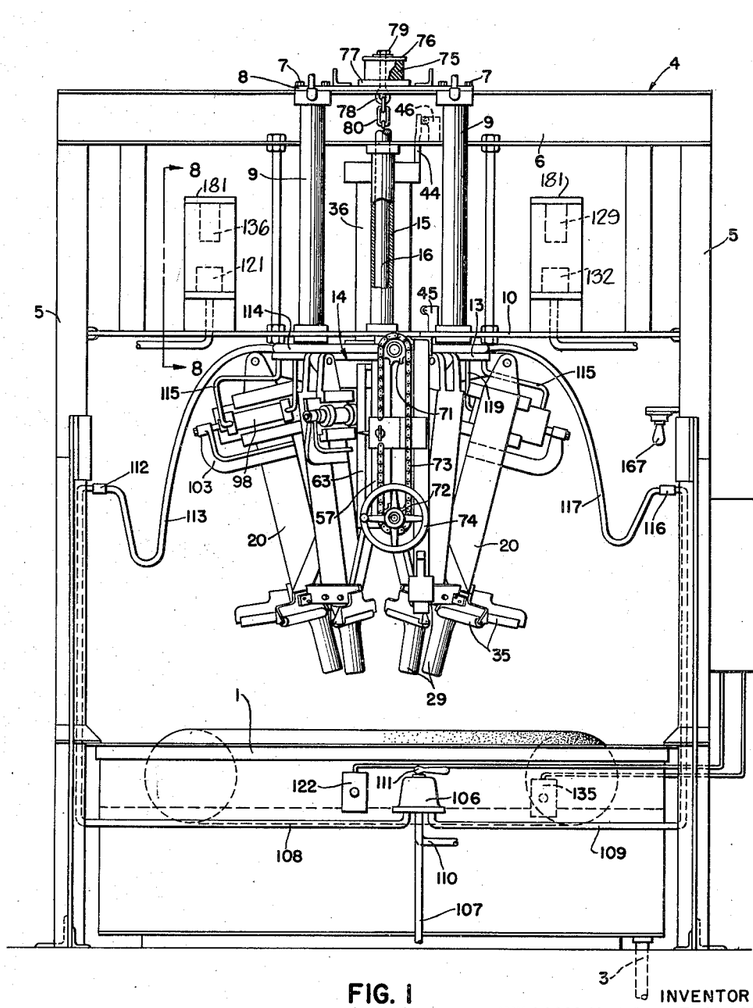
Figure 1 is a side elevation of the apparatus showing the arms in a contracted position.
Figures 2, 3:
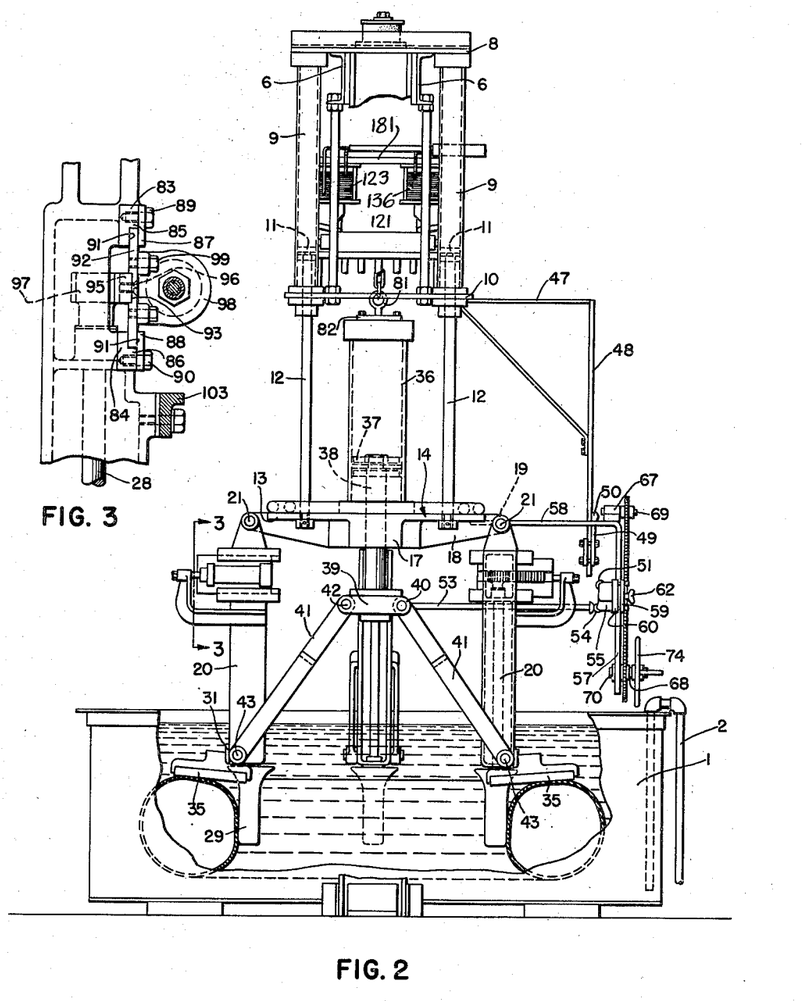
Fig. 2 is an end elevation showing the arms in a partially expanded position.
Fig. 3 is an enlarged view taken on the line 3—3 of Fig. 2.
Figure 4:
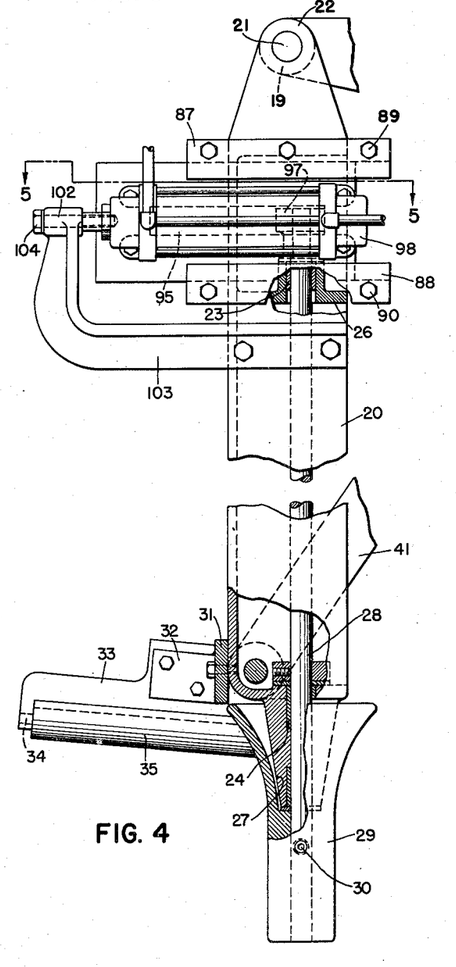
Fig. 4 is a detailed view of one of the arms.

The main body of the arms 20 are of channel shape in cross-section, the upper ends of which terminate in bifurcated lugs 22 which embrace the bosses 19 extending from the spider plate 13, forming hinged connections by the pins 21 as illustrated in Figs. 1, 2 and 4.

As best illustrated in Fig. 4, the arms 20 are provided with bearings 23 and 24. The upper bearings 23 are formed by bosses extending from ribs 26 which are formed across the bight of the channel-shaped portion of the arms 20. The lower bearings 24 are formed by conical terminations 27 at the lower ends of the arms. Shafts 28 mounted to revolve in said bearings are extended through the lower bearings 24 to receive flaring rollers 29, which are attached to the lower end of said shafts by set screws 30. It is advantageous to flare the rollers at their upper ends so that their outer contours will substantially follow the contour of the tubes being tested to more readily control the tubes while being tested.

Attached to the lower end of the channeled portion of the arms 20 as illustrated in Figs. 1, 2 and 4 is a bracket 31 having end portions 32 turned at right angles to the body thereof. To each end portion are bolted similar brackets 33 also having end portions extending at right angles to the body thereof. The end portions are bored to receive shafts 34 on which are mounted rollers 35 which cooperate with the flared rollers 29 to submerge and manipulate tubes while being tested.

It will be noticed that the rollers 35 are slightly tilted upward so that their axes are at an angle slightly greater than a right angle with respect to the axes of the flaring rollers 29. This angular relationship tends to minimize the distortion of the tubes when held by the rollers.

When a partially inflated tube or other article is tested for porosity, or other leaks which may be caused by injury during the course of manufacture, the test is rendered more effective by stretching or tensioning the walls of the article.

The stretching or tensioning of the article is accomplished in the following manner as illustrated in Fig. 2. Mounted upon the spider plate 13 and becoming a part of the carriage 14, a fluid-pressure cylinder 36 has disposed therein a double-acting piston 37 mounted on the upper end of a piston rod 38. The other end of the piston rod has mounted thereon a spider block 39. Radiating from the outer periphery of the block 39, bifurcated lugs 40 receive the single end of forked links 41 which are pivotally mounted thereon by pins 42. The forked end of the links 41 extend obliquely downward, the fork straddling the lower end of the channeled portion of the arms 20 and is pivotally connected thereto by the pins 43.

For the purpose of illustration water is used as a fluid-pressure medium in the cylinders 9 and 36, but other fluid may be used if so desired.

The carriage 14 is lowered by admitting fluid to the upper end of the cylinders 9. The carriage with arms 20 contracted as shown in Fig. 1 is carried downwardly; as the arms 20 approach the opening of the annulus they begin to spread so that the rollers 29 and 35 will properly engage and stretch the tubes during the submerged period.

The cylinders 9 are operated by a solenoid-operated valve, the down movement of the carriage being stopped when a contact arm 44, mounted on top of the cylinder 36, contacts an electric stop-switch 45 mounted on the platform 10. To stop the upward movement of the carriage the arm 44 contacts the stop-switch 46 attached to the upper part of the frame work 4.

It is important to stretch partially inflated tubes so that their walls will be in tension while submerged, otherwise a limited degree of porosity may not be revealed due to the limited pressure within the tubes.

It has been established that a radial stretch, equal to approximately 40% of the inner diameter of the annulus being tested, will be sufficient to reveal any porosity that may exist in the walls of tubes of the character herein under consideration.

To provide each size of tube the same proportionate stretch an indexing means, which operates in conjunction with a pair of limit switches, automatically controls the extent of spread of the arms 20 when the rollers 29 and 35 are in engagement with the tubes.

The stretch or distortion-controlling means (see Figs. 1 and 2) is composed of a bracket 47 attached to the platform 10. Said bracket terminates in a downwardly extending vertical arm 48, to which is attached a switch-contact member 49 having formed thereon a rounded cam surface 50 which is engaged by a contact arm 51 of a switch 52 during the downward course of the carriage 14. This contact actuates a solenoid-operated valve which admits fluid to the upper end of the cylinder 36. This will drive the spider block 39 downwardly, whereby the arms 20 begin to spread by the action of the links 41.

The spreading of the arms continues as the carriage moves downwardly until a contact arm 53 carried on the spider block 39 engages a contact arm 54 of a switch 55, which closes a solenoid-operated valve to stop the spread of the arms 20. This carriage 14 continues downwardly until the stretched tube is properly submerged. The limit of the downward movement of the carriage 14 is controlled by the contact member 44 contacting the arm of the limit switch 45 mounted on the platform 10. The submerged tube is held in this position for a predetermined period of time, then released by a reverse action of the values and cylinders as will later be described.

Figure 6:
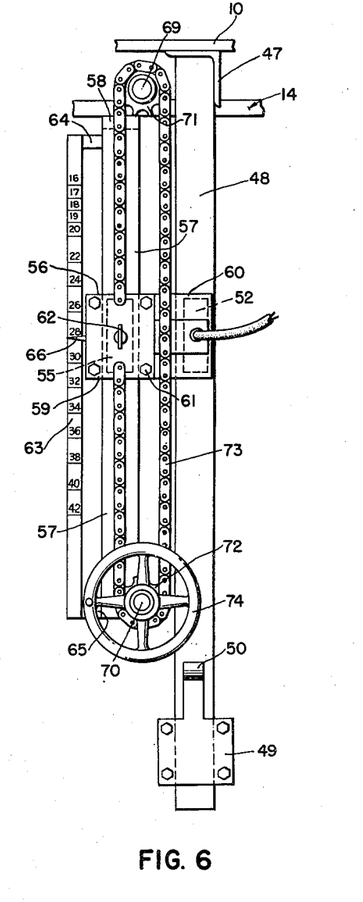
Fig. 6 is a view of the size-indicating device.
Figure 7:
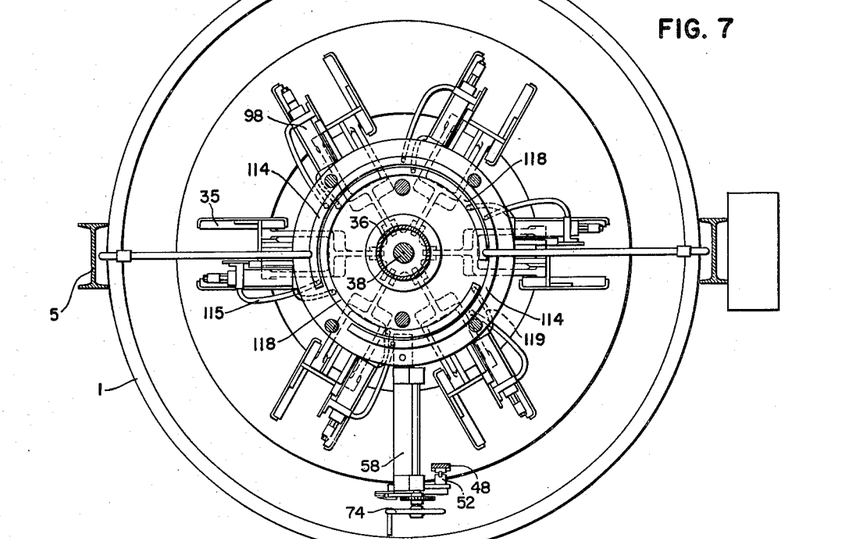
Fig. 7 is a plan view of the apparatus.

The switches 52 and 55 (see Figs. 2 and 6) which control the spread of the arms 20 and the stretch of the tubes, are mounted on a slide 56 which slides up and down on the vertical arm 57 of a bracket 58. (See Figs. 1, 2 and 6.) The slide comprises a pair of plates 59 and 60 which are grooved to receive the vertical arm of the bracket 58 and held together by the bolts 61. A thumb screw 62 passes through the plate 59 and contacts the vertical arm to lock the slide in place when set in the desired position. A calibrated bar 63, having numerals on the face thereof which correspond to the inside diameters of the tubes being tested, is attached to the vertical arm 57 of the bracket 58 by brackets 64 and 65. A pointer 66 is attached to the slide 56 which indicates the sizes of tubes to be tested. For instance, if tubes having an inside diameter of 28 inches are to be tested, the pointer will be set at the numeral 28 on the calibrated bar 63.

Mounted on the bracket 58 are bearings 67 and 68 which receive shafts 69 and 70, on which are mounted sprocket wheels 71 and 72. These sprockets are embraced by a chain 73. The ends of the chain are attached to the slide 56. Also mounted on the shaft 70 is a hand wheel 74 which, when revolved, causes the slide, on which the limit switches 52 and 55 are mounted, to be moved along the vertical arm 57. This will permit the limit switches to be positioned the proper distance from the cam surface 50 on the bracket 47 and the contact arm 53 so that the various sizes of tubes will be given the proper proportionate stretch according to their inside diameters, which will be indicated by the pointer 66.

To check the jar caused when the carriage reaches its extreme downward position, a cushioning device is employed (see Fig. 1). The device comprises a cushion of rubber 75 of cylindrical form positioned between a pair of washers 76 and 77, an eye bolt 78 extends axially through the cushion and washers and is attached thereto by a nut 79. The cushioning device is mounted on the rectangular plate 8 centrally located with respect to the arm-spreading cylinder 36. The eye bolt extends through an opening in the plate 8 and has attached to the eye thereof a chain 80. The other end of the chain extends to the top of the cylinder 36 and is attached to an eyebolt 81 secured in a plate 82 mounted on the cylinder 36. The chain is of the proper length to permit the cushioning device to become effective just before the carriage reaches its extreme downward motion to ease the shock and prevent possible damage to the apparatus.

When the carriage is in its lowermost position, the tube being tested is radially stretched or distorted form and entirely submerged, the apparatus comes to rest. In this position the tube is observed for leaks which if present are located by tell-tale bubbles which rise to the surface of the testing fluid in the tank in which the tube is submerged. If leaks appear they are marked for location and later repaired or rejected as defective, depending on the degree of the defects.

When a tube is properly submerged and stretched the tube is held by the rollers 29 and 35 tightly enough to seal any porosity in the portions of the tube which are in contact with the supporting rollers. For this reason it is necessary to revolve the tube far enough to relieve these surfaces so that they will be exposed for test.

The tubes are revolved by the flared rollers 29 which are actuated by fluid-pressure means in cooperation with a rack and pinion mounted on the upper end of the channel portion of the arms 20 in the following manner.

Figure 5:
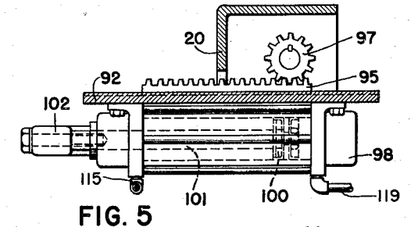
Fig. 5 is a view taken substantially on the line 5—5 of Fig. 4.

Welded or otherwise attached to the upper end of the channel portion of each arm 20, metal bars 83 and 84 have offset portions 85 and 86 to which metal strips 87 and 88 are attached by cap screws 89 and 90. These metal bars and strips cooperate to form slideways 91 to receive plates 92. (See Figs. 3, 4 and 5.)

On one side of said plates 92 a groove 93 is formed to receive racks 95, which are secured therein by countersunk screws 96. The teeth of said racks meshing with the teeth of the pinions 97 mounted on the upper ends of the shafts 28. On the opposite sides of said plates 92 fluid-pressure cylinders 98 are attached thereto by cap screws 99.

The cylinders 98 have disposed therein double-acting pistons 100 to which are attached piston rods 101. The outer ends of the piston rods extend to bosses 102 formed on angular brackets 103 which are attached to the arms 20. The piston rods are rigidly attached to the brackets by cap screws 104 extending through the bosses 102 and screwed into tapped holes provided in ends of the piston rods 101, so that when fluid pressure is admitted to the cylinder the piston remains stationary, permitting the cylinders to move, thus causing the plates 92 to slide in the grooves or slideways 91, which will cause the shafts 28 and rollers 29 to revolve in either direction through the action of the racks 95 and pinions 97. The direction of rotation depends on into which end of the cylinders the fluid pressure is admitted.

For the purpose of illustration, air is used to operate the pistons 100 within the cylinders 98.

The cylinders 98 are actuated by the manipulation of a valve 106 attached to the side of the tank 1. The valve is a commercial article and has connected thereto an inlet conduit 107 which extends to a source of fluid supply under pressure, outlet conduits 108 and 109, an exhaust port 110 and an operating lever 111.

As illustrated in Figs. 1 and 3 the conduit 108 extends from the valve 106 around the tank 1 to one of the vertical members 5 and extends upward therealong, terminating with a connection 112 to which a flexible hose 113 is attached. The hose extends to a manifold 114 which is provided with suitable connections, to which are attached lengths of flexible hose 115 which extend to one end of the cylinders.

The conduit 109 extends to the opposite vertical member 5 then upwardly and terminates in a connection 116 to which is attached a flexible hose 117, which extends to a manifold 118 from which are extended flexible hose 119, which by suitable connections are attached to the other ends of the cylinders 98.

The manifolds 114 and 118 are in the form of the greater part of a circle and are attached to the upper side of the spider plate 13.

Thus it will be apparent that by the manipulation of the valve lever 111 fluid under pressure may be admitted to either end of the cylinders 98 which, due to the fact that the pistons remain stationary, cause the cylinders to move in either direction, which in turn causes the plates 92, to which the cylinders are attached, to slide in the slideways 91. This actuates the racks 95 which are attached to the opposite side of the plates 92. The movement of the racks drives the pinions 97 which are mounted on the shafts 28 to revolve the rollers 29 which in turn revolves the tube being tested to expose any porosity that may exist at points where the first contact was made between the tube and the rollers 29 and 35.

Figure 8:
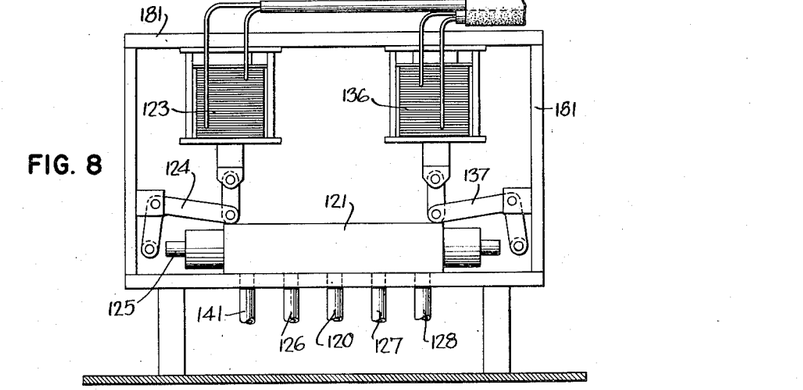
Fig. 8 is a side view taken on the line 8—8 of Figure 1 of the solenoid-operated valve for raising and lowering the carriage.

The valves for supplying fluid under pressure to the four cylinders 9 which raise and lower the carriage 14 and the single cylinder 36 which controls the spread of the arms 20 are 4-way double solenoid-operated valves of identical conventional form which may be procured in units as illustrated in Fig. 8. The units comprise a frame 131 in which are mounted a valve 121 and a pair of solenoids 123 and 135 which operate either side of the valve through suitable linkage as will now be described in conjunction with the piping diagram as illustrated in Fig. 9.

Figure 9:
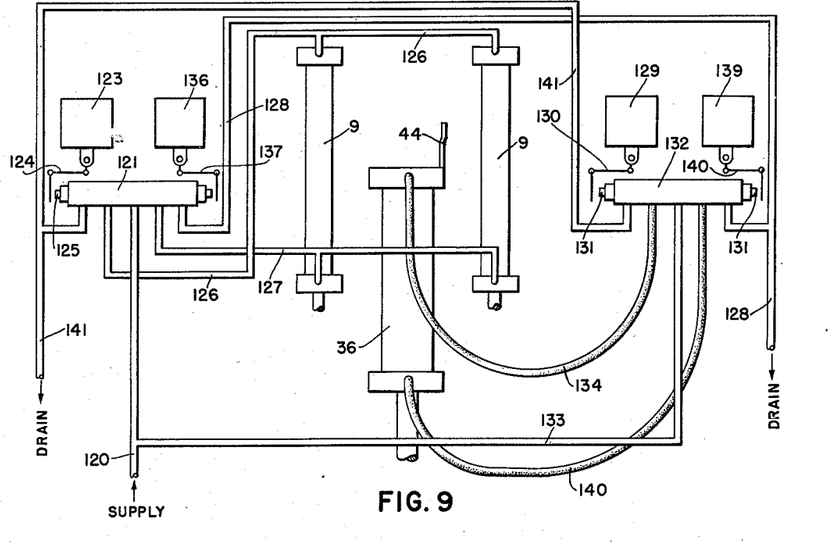
Fig. 9 is a piping diagram.

Referring to Figs. 8 and 9, a supply line 120 extends from a source of fluid supply under pressure (not shown) to the valve 121. This valve supplies fluid under pressure to the four cylinders 9 which serve to raise and lower the carriage 14. When a switch 122 attached to the tank (see Fig. 1) is closed, through a coil and relay the solenoid 123 is energized causing the bell crank 124 to depress the plunger 125. This permits fluid to flow through the outlet conduit 126 to the top of cylinders 9. At the same time the opposite side of the valve is open to the conduit 127 and the drain line 128 which permits fluid to escape from the lower ends of the cylinders 9.

This will cause the carriage 14 to move downwardly. When the arm 51 of the switch 52 (see Fig. 2) contacts the cam 50 mounted on the arm 48 the solenoid 129 is energized, which actuates the bell crank 130 to depress the plunger 131 of the valve 132. This permits fluid to flow through the branch supply line 133, through the valve and flexible conduit 134 to the upper end of the cylinder 36. This will cause the arms 20 to spread until the contact arm 53 contacts the arm 54 of switch 55 (see Fig. 2), which terminates the spread by deenergizing the solenoid 129. When the solenoids are deenergized the valves automatically return to a neutral position.

After a predetermined period of time, due to a time switch, in which the tube is held in a submerged and radially stretched position, the switch 135 on the opposite side of the tank is depressed. This actuates the proper coil and relays to energize the solenoid 136 which actuates the bell crank 137 to depress the plunger at the opposite end of the valve 121 to permit fluid to flow from the valve 121 through the conduit 127 to the lower end of the cylinders and at the same time permit fluid to drain from the upper ends of the cylinders through the conduit 126 through the valve and into the drain conduit 128, to permit the carriage to raise.

At the same time the carriage is raised the solenoid 139 is energized, which actuates the bell crank 140 to depress the plunger 131 of the valve 132. This supplies fluid under pressure from the valve 132 through the flexible conduit 140 to the lower end of the cylinder 36 and permits fluid to drain from the upper end of the cylinder 36 through the flexible conduit 134 through the valve 132 then into the drain conduit 141. This allows the arms to retract while the carriage is being raised. As the cylinder 36 travels with the carriage it is necessary that flexible conduits 134 and 140 in the form of hose be used to connect the valve 132 with the cylinder 36.

Figure 10:
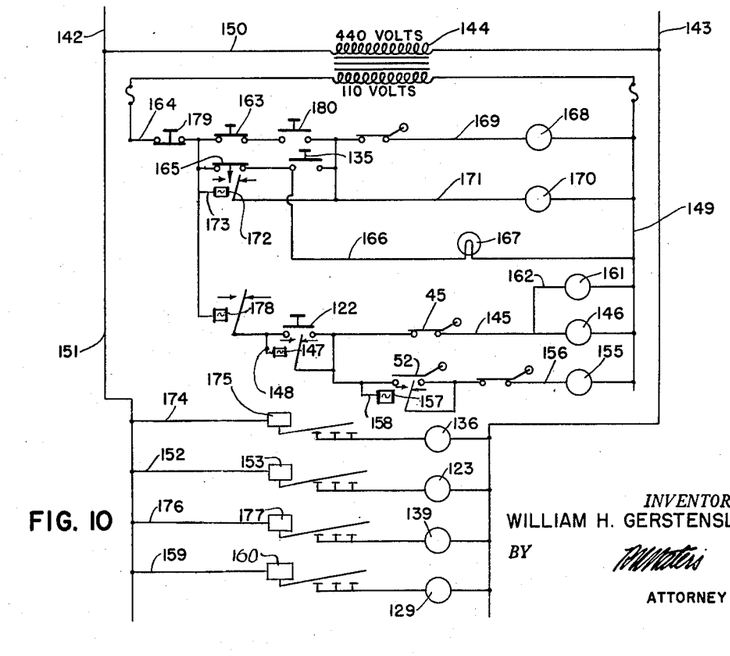
Fig. 10 is a wiring diagram.

The electric circuits for controlling the apparatus are shown in the wiring diagram of Fig. 10. In the diagram current is supplied from the main feed lines 142 and 143, 440 volts is required to operate the solenoids but 110 volts is used to operate all other contacts, therefore a transformer 144 is provided in the main supply lines.

When the carriage 14 is in its uppermost position and the arms 20 retracted the apparatus is in its neutral position the switch 122 is closed thereby closing the line 145 which leads to a relay coil 146, which in turn closes the relay 147 in the shunt line 148. This permits current to pass through the lines 145, 149 through the transformer 144, then lines 150, 151 and 152 to the multiple relay 153 which actuates the solenoid 123. This actuates the valve 121 to permit fluid under pressure to flow to the upper end of the cylinders 9 which will lower the carriage 14. The carriage on its downward course causes the cam surface 50 to contact and close the switch 52 which energizes the relay coil 155 in the line 156. This in turn closes the relay 157 on the shunt line 158 which starts the arms 20 to spread by current passing through the lines 149, the transformer 144, lines 151 and 159 to the multiple relay 160. This energizes the solenoid 129 which actuates the valve 132 to admit fluid to the upper end of the cylinder 36. The spread of the arms is stopped when the contact member 53 contacts the switch arm 54. The carriage continues downwardly until the contact member 44, attached to the top of the cylinder 36, contacts and opens the down limit switch 45 which is attached to the platform 10. This opens the line 145.

At the same time the coil 146 is energized a coil 161 in the line 162 opens a switch 163 in the line 164 which in turn opens a time delay switch 165 in line 166. The time delay switch is set to close in a predetermined period of time (about 12 seconds), during which time the carriage cannot be raised. This is to assure sufficient time for the tube to be properly tested before being released. When the time has elapsed the time delay switch closes causing the light 167 to signal that the carriage may be raised.

To raise the carriage 14 and retract the arms 20 the switch 135 is closed. This energizes the coil 168 in line 169, also the coil 170 in line 171, and closes the relay 172 in line 173. This directs current through the lines 169, 149, 151 and 174 to the multiple relay 175 to actuate the solenoid 136 which in turn actuates the valve 121 so that fluid is directed to the lower ends of the cylinders 9 to raise the carriage.

Simultaneously current is directed through the lines 171, 149, 151 and 176 to the multiple relay 177 to actuate the solenoid 139 which in turn actuates the valve 132 to direct fluid under pressure to the lower end of the cylinder 36 to retract the arms.

At the same time the switch 135 is closed the normally closed relay 178 opens to cut off current to the circuits which cause the carriage to be lowered. This will permit the contact member 50 to pass the contact arm 51 of switch 52 in its upward course so that the retraction of the arms will not be interrupted.

The limit of the upward movement of the carriage is controlled by the contact member 44 located on top of the cylinder 36 contacting the up limit switch 46 attached to the upper part of the frame which opens all lines, at which time the apparatus is in neutral position, ready to repeat the cycle.

For safety to the operators and to prevent damage to the apparatus or the article being tested, emergency switches 179 and 180 of the push-button type are provided in the feed line 164, whereby the apparatus may be stopped or raised at will, the switch 179 normally closed may be opened to stop the apparatus. The switch 180 normally open may be closed to raise the carriage to a neutral position. Even though it is believed the operation of the apparatus will be apparent from the foregoing description, a brief review thereof will now be made for the purpose of summary and simplification.

The cycle of operation of the apparatus, including the duties of the operators, is as follows:

The tubes are delivered to the apparatus in a deflated condition. There are two operators required to operate the apparatus, one at the front and the other at the rear side. The operator at the front of the apparatus inflates a tube so that it is well rounded out and the wall is slightly in tension. He then places the tube centrally in the tank, then depresses the push button of the switch 122 (see Fig. 1) which will start the carriage downwardly. As the rollers 29 enter the opening of the tube the cam member 50 contacts the arm 51 of switch 52 (see Fig. 2) which starts the arms 20 to spread, the rollers 35 then contact the upper surface of the tube to submerge same. The stretching of the tube continues until the contact arm 53 contacts the arm 54 of switch 55. The carriage continues downwardly until the contact member 44 on the cylinder 36 contacts the limit switch 45 to bring the carriage to rest in its lowermost position, at which time the operators observe the tube for leaks. The front operator then manipulates the lever 111 of valve 106 which will rotate the tubes to reveal hidden porosity that may be concealed at the original points of contact between the tube and rollers. The operators again observe the tube for porosity. After a few seconds the light 167 will show, indicating that the carriage may be raised. The rear operator then depresses the push button of switch 135 which serves to set in motion the mechanism to raise the carriage; as the carriage raises the arms 20 retract, releasing the tube which, when free, is removed from the tank by the rear operator. The carriage raises until the contact member 44 contacts the contact arm of the switch 46 to bring the carriage to rest in its neutral position ready for another cycle.

From the foregoing description, it will be apparent that an apparatus of a practical nature, convenient to operate, and efficient in operation has been produced by the present invention. From its automatic nature, it will save time and by its use a more dependable product will be produced.

While in accordance with the patent statutes one best-known embodiment of the invention has been illustrated and described in detail, it is to be particularly understood that the invention is not limited thereto or thereby, but that the inventive scope is defined in the appended claims.

I claim:

1. An apparatus for testing annular elastic pneumatic tubes comprising an open-topped liquid-containing vessel, a carriage, fluid-pressure actuated cylinders for raising and lowering said carriage in a vertical path to submerge said tubes, a series of arms suspended from said carriage, a fluid pressure actuated cylinder for spreading said arms to stretch said tubes, and rollers mounted on the lower ends of said arms to engage and rotate said tubes.

2. An apparatus for testing inflatable annular elastic tubes comprising an open-topped liquid-containing vessel, means for submerging an inner tube in said liquid, said means comprising a carriage suspended above said vessel, hydraulic means for raising and lowering said carriage, arms swingably suspended from said carriage, hydraulic means for radially spreading said arms, and rollers mounted at the lower ends of said arms for manipulating said tube while submerged.

3. An apparatus for testing inflated inner tubes for pneumatic tires comprising an open-topped liquid-containing vessel, means for vertically submerging a partially inflated inner tube, said means comprising swingably mounted arms suspended above said vessel, fluid pressure means for lowering and raising said arms and roller means disposed on said arms for submerging and manipulating the tubes to disclose leaks therein.

4. An apparatus for testing inner tubes for pneumatic tires and the like comprising a liquid-containing vessel, a carriage suspended above said vessel, fluid-pressure means for lowering and raising said carriage, arms swingably suspended from said carriage, fluid-pressure means for spreading said arms radially when the carriage is on its downward movement and retracting the arms on their upward movement, and roller means for submerging and manipulating the tube during the testing thereof.

5. An apparatus for testing annular inflatable elastic tubes comprising an open-topped liquid containing vessel, a carriage having a body member centrally suspended above said vessel, arms pivotally connected about the periphery of the body of said carriage, fluid-pressure means for lowering and raising said carriage to submerge and release a tube, fluid-pressure means for spreading the arms outward to stretch the tubes and a fluid-pressure means which actuates a rack and pinion to rotate the tube while submerged in the testing liquid.

6. An apparatus for testing inflatable annular elastic tubes for pneumatic tires comprising an open-topped liquid-containing vessel, a frame, a carriage suspended from said frame above the liquid, fluid-pressure means for actuating said carriage, arms pivotally suspended from said carriage, a series of rollers extending laterally from said arms to submerge a tube in said liquid, another series of rollers extending axially from said arms, means for rotating said rollers embodying fluid-pressure cylinders in cooperation with racks and pinions, and a time limit means to submerge the tubes for a predetermined period of time.

7. An apparatus for testing annular inflatable inner tubes comprising a liquid-containing vessel, a carriage suspended centrally above said vessel, fluid-pressure actuated cylinders for raising and lowering said carriage, a spider plate forming the body of said carriage, a series of arms pivotally suspended from the periphery of said spider plate, a fluid-pressure actuated cylinder for radially spreading and retracting said arms and rollers attached to said arms to engage and manipulate the tubes while being tested.

8. An apparatus for testing annular resilient inflatable inner tubes, comprising a liquid-containing vessel, a support, a carriage suspended from said support above said vessel, fluid-pressure actuated cylinders for lowering and raising said carriage in a vertical path, a spider plate forming the body of said carriage, a series of arms pivotally suspended about the periphery of said spider plate, a series of rollers extending substantially horizontally from said arms to submerge a tube, a series of rollers extending axially from said arms to engage and radially stretch the tube and fluid-pressure actuated cylinders carried by said arms to rotate said axially extending roller to rotate said tube to disclose defects therein at the previous points of contact with said rollers.

9. An apparatus for testing inner tubes for pneumatic tires comprising a liquid-containing tank, a frame work support, a carriage suspended from said support, a plurality of fluid-pressure cylinders mounted on said frame work support for raising and lowering said carriage, a spider plate forming the body of said carriage, a series of arms pivotally mounted about the periphery of said spider plate, a fluid-pressure cylinder mounted on said spider plate to spread and retract said arms, a series of rollers extending substantially horizontally from said arms to submerge the tubes, a series of rollers extending axially from said arms to engage and radially stretch the tubes and fluid-pressure means to actuate racks and pinions for revolving said axially extending rollers to rotate the tubes while submerged.

10. In a pneumatic tube-testing apparatus of the type described, a liquid-containing tank, a frame work support, a carriage suspended from said support, a plurality of pressure cylinders mounted on said frame to lower and raise said carriage, a solenoid-operated valve mounted on said support to admit fluid to said cylinders, a spider plate forming the body of said carriage, a series of arms pivotally suspended from the periphery of said spider plate, a fluid-pressure cylinder mounted on said spider plate, a piston rod extending from said cylinder, a spider block attached to said piston rod, links extending from said spider block to said arms, a solenoid-operated valve mounted on said frame work to admit fluid to said cylinder to spread and retract said arms through the action of said piston rod, spider block and links, rollers extending axially from said arms, and means for revolving said rollers to rotate said tubes while submerged, said means comprising racks and pinions actuated by fluid pressure cylinders.

11. In an apparatus for testing inner tubes for pneumatic tires, a testing-liquid-containing tank having an open top, a carriage centrally suspended above said tank, fluid-pressure cylinders to raise and lower said carriage to submerge the tubes, arms pivotally suspended from said carriage, a fluid-pressure cylinder mounted on said carriage to radially spread said arms, fluid-pressure cylinders carried by said arms to rotate the tubes, a solenoid-operated valve to supply fluid to the cylinders for raising and lowering the carriage and another solenoid-operated valve to supply fluid to the cylinder to radially spread and retract the arms.

12. In an apparatus for testing annular pneumatic inner tubes, a liquid-containing vessel, a carriage suspended above said vessel and centrally thereto, a plurality of fluid-pressure cylinders to raise and lower said carriage to submerge a tube, said cylinders being actuated by a solenoid-operated valve, a series of arms suspended from said carriage, a fluid-pressure cylinder mounted on said carriage, a solenoid-operated valve to actuate said cylinder, a piston rod extending from said cylinder, links connecting said piston rods to said arms to radially spread and retract said arms to stretch and then release the tubes, and fluid pressure actuated rollers mounted on said arms to rotate said tubes while submerged.

13. In an apparatus for testing annular pneumatic tubes, a liquid-containing tank, a carriage suspended centrally above said tank, a plurality of fluid-pressure cylinders to raise and lower said carriage in a vertical path to submerge said tubes in said liquid, said cylinders being actuated by a solenoid-operated valve, a series of arms carried by and suspended from said carriage, a fluid-pressure cylinder carried by said carriage, a solenoid-operated valve to actuate said cylinder to spread said arms to stretch said tubes, and retract the arms to release said tubes when tested, and fluid pressure actuated racks and pinions to rotate a plurality of rollers attached to said arms to engage and rotate said tubes while submerged.

14. An apparatus for testing annular pneumatic inner tubes comprising an open-topped liquid-containing vessel, a vertically reciprocable carriage suspended above said vessel, fluid-pressure means for effecting reciprocal movement to said carriage, expander means comprising a plurality of fluid pressure actuated arms pivotally suspended from said carriage, angularly disposed roller means extending from said arms to engage the upper wall of a tube upon lowering said carriage to submerge the same, roller means disposed axially on said arms for engaging the inner wall of a tube for radially stretching and holding the same while submerged, and fluid pressure actuated racks and pinions to rotate said last-named rollers and the tube engaged therewith when fully submerged.

WILLIAM H. GERSTENSLAGER.

REFERENCES CITED

The following references are of record in the file of this patent:

UNITED STATES PATENTS

| Number | Name | Date |
| --- | --- | --- |
| 1,695,979 | Reid | Dec. 18, 1928 |
| 1,854,556 | Moebes et al. | Apr. 19, 1932 |
| 1,863,764 | Prentice | June 21, 1932 |
| 1,908,311 | Branick | May 9, 1933 |
| 2,135,681 | Smith et al. | Nov. 8, 1938 |